Nov. 21, 1967   R. I. BERGMAN   3,353,334
RECOVERY OF ENTRAINED SOLIDS FROM GASES
Filed June 9, 1965   2 Sheets-Sheet 2

INVENTOR
RICHARD I. BERGMAN
BY:
Burgess, Dinklage and Sprung
ATTORNEYS.

United States Patent Office 3,353,334
Patented Nov. 21, 1967

3,353,334
RECOVERY OF ENTRAINED
SOLIDS FROM GASES
Richard I. Bergman, Princeton, N.J., assignor to Princeton Chemical Research Inc., Princeton, N.J., a corporation of New Jersey
Filed June 9, 1965, Ser. No. 462,707
13 Claims. (Cl. 55—94)

This invention relates to new and useful improvements in the recovery of entrained solids from gases. The invention more particularly relates to an improved process for scrubbing extremely fine entrained reaction solids from reaction tail gases. The invention is particularly concerned with the scrubbing of pyromellitic dianhydride (PMDA) from the reaction tail gas obtained in the vapor phase catalytic oxidation of durene.

In my co-pending application, Ser. No. 385,801, filed July 28, 1964, now abandoned, a process is described for the catalytic oxidation of alkyl aromatic hydrocarbons as for example durene to form PMDA.

The reaction product of this process, such as the PMDA, is entrained as very fine, solid particles in the reaction tail gas stream.

Certain difficulties have been encountered in the effective and efficient recovery of these entrained solids from the reaction tail gas, the most successful and efficient recovery method involving the use of a filter surface, such as a dust bag collector.

It is known to remove and collect entrained solids from gas streams with scrubbers in which the particles are scrubbed or washed out of the gas with a scrubbing liquid. When attempting to scrub the solid reaction products, such as the PMDA, from the reactor tail gases of the catalytic oxidation of alkylbenzenes, difficulties are encountered and the recovery yield is very low. Thus, for example, when attempting to recover the PMDA from the reactor tail gases produced in the process of my said co-pending application, by liquid scrubbing, using the conventional scrubbers, packed towers, or the like, the efficiency of the recovery may drop well below 50%, and this high loss and low yield is encountered even when the gas rate is reduced or the liquid rate increased as for example, even to the point of flooding the scrubbing tower.

This difficulty of a low recovery yield in scrubbing towers has also been encountered when attempting to recover certain other very fine entrained solid dust particles from reaction gas streams by liquid scrubbing, as for example phthalic anhydride from the catalytic vapor phase oxidation of naphthalene or orthoxylene and aromatic nitriles and dinitriles from the catalytic vapor phase am-oxidation of the corresponding alkyl benzenes.

One object of this invention is a novel method for the efficient and effective scrubbing of very fine solid particles from gas streams such as those exiting from vapor phase catalytic reactions.

A further object of this invention is the efficient and effective scrubbing of finely divided, solid reaction particles from reaction gas streams obtained in the vapor phase catalytic oxidation of alkyl-benzenes, such as durene, ethyl trimethyl benzene, tetrapropyl benzene, isobutyl trimethyl benzene, and the like.

These and still further objects will become apparent from the following description read in conjunction with the accompanying drawing which diagrammatically shows an embodiment of an arrangement for scrubbing in accordance with the invention.

In accordance with the invention, I have surprisingly discovered that the prior art difficulties in scrubbing finely divided solids from gas streams, such as the scrubbing of the reaction products obtained in the vapor phase catalytic oxidation of alkylbenzenes may be avoided and a practically quantitative recovery achieved if the scrubbing liquid is initially at least partially converted to aerosol form, contacted with the flowing gas stream in this form with a contacting power sufficient to cause a friction loss of at least 960 (foot pound force)/lb. mass and thereafter the scrubbing liquid is separated from the gas as for example by a further conventional scrubbing, the use of a cyclone, or the like.

The initial conversion of the scrubbing liquid to the aerosol form may be effected in any known or conventional manner, as for example by the use of aerosol nozzles, or sprays, or the like. It has been found convenient to simply pass the gas to be scrubbed through a venturi constriction into which scrubbing liquid is also fed as for example co-current with the gas stream.

The contacting power between the gas stream being treated and the scrubbing liquid is a well-known and conventional concept in the scrubber art and is actually a measure of the work dissipated by the actual contacting per unit of volumetric gas flow. The work dissipation involves a friction loss occurring between the gas and liquid being contacted and may be calculated in accordance with the formula $$F = -\int_{P_1}^{P_2} v\, dp$$

in which F is the friction loss (foot pound force)/pound mass, $P_1$ and $P_2$ are the pressures before and after the contacting in pounds force/ft.$^2$ and $v$ is the specific volume in cubic feet/pound mass. This is equal to $-v\Delta p$ where $\Delta p$ is the pressure drop that occurs in the scrubbing, usually expressed in inches of water or pound-force/foot$^2$. As mentioned, in accordance with the invention, the contacting power must be sufficient to cause a friction loss of at least 960 (foot pounds force)/pound mass with $\Delta p$ being measured in pounds/force/foot$^2$.

Understanding of this invention will be facilitated by reference to the accompanying drawing, in which.

Figure 1:
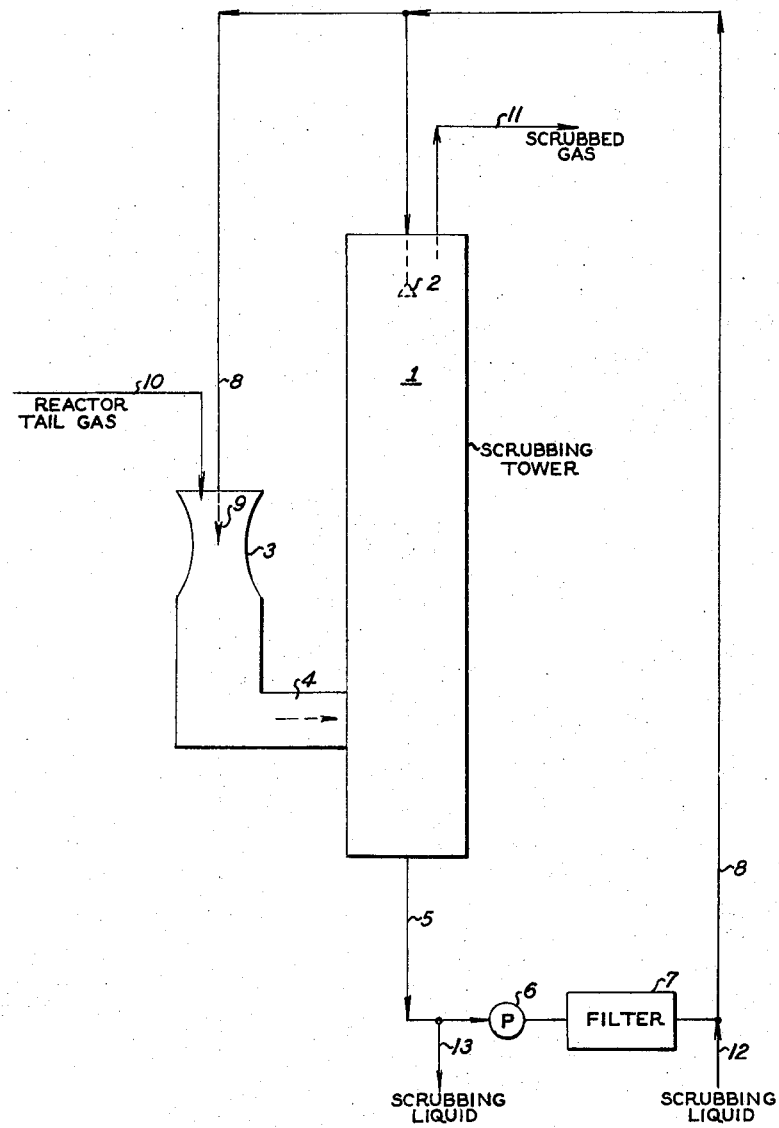
FIG. 1 is a flow diagram of one embodiment of this invention.
Figure 2:
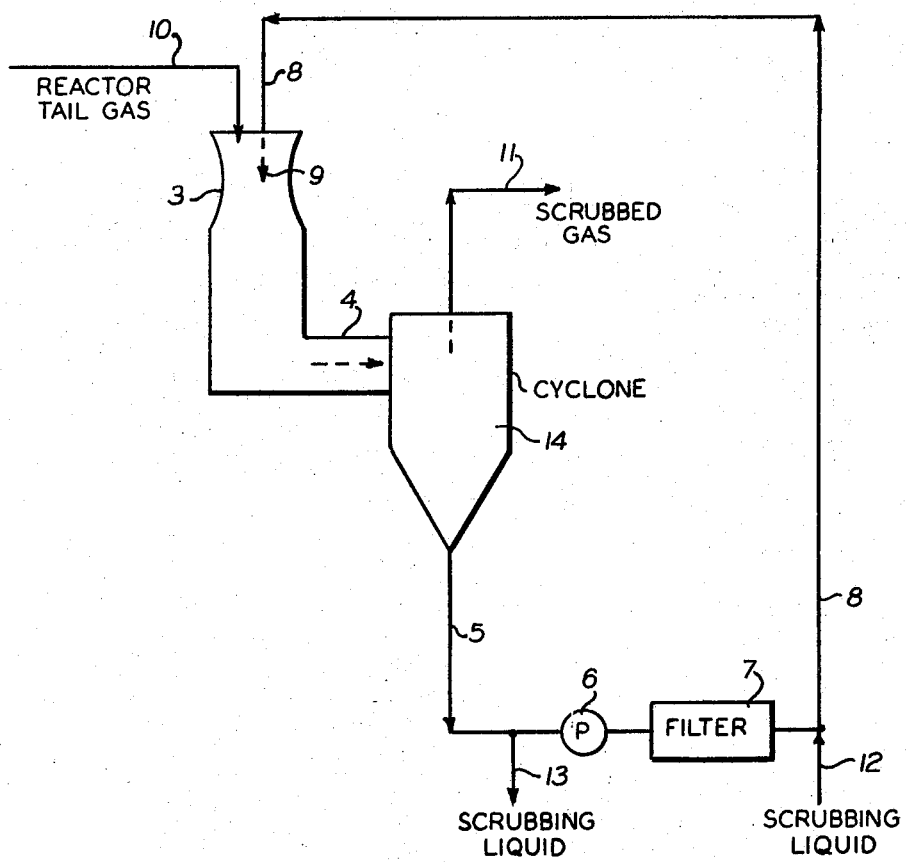
FIG. 2 is similar to FIG. 1 showing an alternate embodiment of this invention.

Referring to the embodiment shown in FIG. 1 of the drawing, 1 represents a washing or scrubbing tower of conventional construction provided with the shower or spray head 2 for the scrubbing liquid. The gas inlet for the tower is provided by the venturi throat or restriction 3 and inlet pipe 4 which leads in to the lower portion of the tower. The scrubbing liquid is withdrawn from the base of the tower through the pipe line 5, and is pumped by the pump 6, through filter 7, and pipe line 8 to the spray head 2 and an inlet nozzle 9 leading into the venturi throat. The reactor tail gas is fed in through the pipe line 10, and the scrubbed gas removed through the exhaust 11. Make-up scrubbing liquid is provided through the inlet 12 and purge removed through the flow off 13.

In operation, the gas to be scrubbed containing the finely divided entrained solids, such as the reaction gas from the vapor phase catalytic reaction for the production of PMDA is passed through the line 10 into the venturi throat 3. Scrubbing liquid is fed from the line 8 through the nozzle 9 into the throat along with the gas and by the carburation action in the venturi throat is initially at least partly converted to an aerosol which is contacted with the reactor tail gas. The reactor tail gas is passed through the venturi throat with sufficient velocity so that it contacts the aerosol scrubbing liquid with a contacting power sufficient to cause a friction loss of at least 960 (foot pounds force)/pound mass. The gas stream carrying the contacted aerosol scrubbing liquid therewith passes through the inlet 4 and up through the scrubbing tower 1 where the same is contacted with a spray of the scrubbing liquid from the spray head 2. This removes the aerosol and entrained solids which accumulate with a body of the scrubbing liquid at the bottom of the tower 1 and which are pumped through the pipe line 5 by the pump 6 through the filter 7 where in the case of the use of a scrubbing liquid in which the solids are not soluble, the solids are removed with the scrubbing liquid being recirculated through the pipe line 8. A portion of the scrubbing liquid may be withdrawn through the line 13 for purification in the conventional manner and fresh scrubbing liquid in an amount to make up the quantity withdrawn and lost in the process supplied through the pipe line 12.

In the case of the use of a scrubbing liquid in which the solids are soluble, the entire quantity of scrubbing liquid is withdrawn at 13, the dissolved material recovered in the conventional manner and regenerated scrubbing liquid and/or fresh scrubbing liquid pumped in at 12; the filter 7, being dispensed with in this case.

The scrubbed gas from which the solid particles have been removed is withdrawn at 11 and handled in the conventional manner as for example by the separation of further components, recycling, or the like.

In place of using the venturi effect, of the venturi throat 3, in order to convert the scrubbing liquid to aerosol form, it is possible to convert the same to this form for initial contacting with the reactor tail gas in any other known or conventional manner, as for example by use of nozzles, injectors, or atomizers, or the like.

The term "aerosol" as used herein has its conventional meaning designating a colloidal system in which the gas is the continuous or surrounding phase and the particles of the scrubbing liquid are the discontinuous or divided phase. In forming the aerosol in accordance with the invention, it is necessary to use from about .005 to 0.86 gallon of scrubbing liquid per cubic foot of gas. The particle size of the scrubbing liquid which forms the discontinuous phase may vary between about 1 and 10,000 microns in diameter.

In place of the scrubbing tower 1, as shown in FIG. 1, other known and conventional modes may be used for separating the scrubbing liquid from the gas after the initial contacting with the scrubbing liquid in the aerosol form.

Thus, for example, in place of the tower 1, any of the known and conventional cyclone separators, 14, as shown in FIG. 2, packed towers, towers filled with washing liquid, towers provided with bubble caps and the like may be provided.

As scrubbing liquids in the process, any of the known or conventional scrubbing liquids may be used. Thus, for example, in the case of separating PMDA from reactor tail gases, scrubbing liquids in which the PMDA is insoluble, partly soluble, or soluble may be used.

Although not wishing to be limited by this theory, it is believed that the initial contacting of the gas to be scrubbed with the scrubbing liquid in aerosol form at the specific contacting power converts the fine dust in the gas to larger particle form containing scrubbing liquid. These larger particles may be readily separated from the gas in the known and conventional manner whereas the initial fine particles defy efficient separation in this manner.

The following examples are given by way of illustration and not limitation.

*Example 1*

Durene was oxidized to pyromellitic dianhydride (PMDA) in a vapor phase catalytic process as described in my said co-pending application, Ser. No. 385,801, and specifically under the conditions described in Example 1 of this application. The reactor tail gases from the reactor tube were passed through a separation arrangement as shown in the accompanying drawing in which the venturi throat 3 was sized to give a pressure drop of 2 p.s.i.g. The section past the venturi throat had an inner diameter of ½", the inlet 4 an inner diameter of 1" and the reaction tower 1 an inner diameter of 6" and a height of 10'. The gas was passed through at a rate of 140 s.c.f./hr. so that a pressure drop of 2 pounds p.s.i. gauge occurred across the throat. Water was circulated as the scrubbing liquid at a temperature of 140° F. and a rate of 2 g.p.m. through the spray head 2 and a rate of 0.5 g.p.m. through the nozzle 9. The contacting power at this pressure drop was sufficient to cause a friction loss of 3850 foot (pound force)/pounds mass. The water was recirculated until the concentration of pyromellitic acid had built up to 20% by weight. At this point, the scrubbing was discontinued and all of the scrubbing solution was pumped into a vessel in which it was allowed to cool causing precipitation of the pyromellitic acid which was recovered by filtration. All of the PMDA was recovered from the reactor tail gas and the scrubbed gas was completely free of PMDA particles.

*Example 2*

Example 1 is exactly repeated except that a portion of the recirculating water used as the scrubbing liquid is continuously withdrawn through the outlet pipe 13, cooled and the pyromellitic acid crystals which precipitate recovered by filtration. Sufficient liquid is then discarded from this withdrawn scrubbing liquid so as to keep the concentration of by-products below 20%, and an amount of fresh water equal to the discarded liquid is added and the liquid continuously returned through the pipe 12. Further additional water is added through the pipe 12 to make up any liquid lost by vaporization in the air stream.

*Example 3*

Example 1 is repeated except that the recirculating water, used as the scrubbing liquid, is maintained saturated with the pyromellitic acid, the excess pyromellitic acid scrubbed from the gas stream remaining as a slurry which is removed by the filter 7.

*Example 4*

Example 1 is repeated using various size venturi constrictions capable of producing a pressure drop varying from 0.1 to 5 pounds p.s.i. gauge.

Table I shows the pressure drop, the friction loss, and the percent recovery of the PMDA from the reactor tail gas.

TABLE I

| Pressure Drop | Friction Loss | Percent Recovery of PMDA |
|---|---|---|
| .1 (lbs./in.$^2$) | 191 (ft. lbs./lb.) | 50 |
| .5 | 960 | 85 |
| 2 | 3,850 | 100 |
| 5 | 9,650 | 100 |

*Example 5*

Example 1 is repeated, using however, 1,2,4-trichlorobenzene in place of the water as the scrubbing liquid. In this case the trichlorobenzene is maintained at a temperature between about room temperature and 250° C. PMDA is directly recovered by precipitation and filtration on the cooling of the scrubbing liquid. Alternately, the trichlorobenzene may be kept saturated with PMDA and the removed PMDA directly recovered at the filter 7.

*Example 6*

Example 1 is repeated using, however, the following scrubbing liquids in place of water: p-dioxane, acetone, dimethyl formamide, anisole, diphenyl ether, ethyl ether, methylisobutylketone, Cellosolve acetate, acetic acid, trifluoroacetic acid, dichlorobenzene, a $C_5$—482° F. boiling range petroleum fraction, nitrobenzene, benzonitrile, diglyme, 1-chloronaphthalene, tetrahydrofuran, dichloromethane, tetrachloroethane, hexachloro-1,3-butadiene, and chlorobenzene.

Example 7

Example 1 is repeated except that the tower 1 is replaced by a column filled with Raschig rings through which the scrubbing liquid is trickled downwardly and the reactor tail gas stream, after the initial contacting with the scrubbing liquid in aerosol form, is passed upwardly. The recovery of the PMDA is achieved as in Example 1.

Example 8

Example 1 is repeated except that the scrubbing tower 1 is replaced with:

(a) a cyclone separator having a 6" inner diameter into which the pipe A enters tangentially.
(b) A column provided with bubble cap trays, slot trays, or a shed section.

In each case complete recovery of the PMDA is achieved as in Example 1.

Example 9

Example 1 is repeated except that the initial contacting of the reactor tail gas and the scrubbing liquid in aerosol form is effected using high pressure nozzles. In this case the nozzles are directed into the gas stream and the liquid sprayed into the conduit through which the gas is flowing at a sufficient velocity so as to provide the necessary atomization and contacting power.

Example 10

Example 1 is repeated except that the scrubbing liquid and gas are contacted on a circular disc which is rotated by an electric motor at a sufficiently high speed to provide the necessary contacting power.

Example 11

Example 1 is repeated except that in place of the reactor tail gas containing the PMDA, the following gas streams containing entrained fine particles are treated:

(a) The reaction gas stream from a vapor phase catalytic oxidation process to provide phthalic anhydride by the oxidation of ox-xylene of naphthalene.
(b) The reaction gas stream from a vapor phase catalytic oxidation process to produce maleic anhydride by the oxidation of benzene, butane, butenes, or butadiene.
(c) The reaction gas stream from a vapor phase catalytic aminative oxidation process to produce aromatic nitriles and dinitriles from the corresponding alkyl benzenes.

In each case substantially complete removal of the dust particles is achieved.

While the invention has been described in detail with reference to certain specific embodiments, various changes and modifications which fall within the spirit of the invention and scope of the appended claims will become apparent to the skilled artisan. The invention is, therefore, only to be limited by the appended claims or their equivalents wherein I have endeavored to claim all inherent novelty.

I claim:

1. A method for recovering pyromellitic dianhydride from the reaction gas of a vapor phase catalytic reaction for its production which comprises flowing the reaction gas in contact with a scrubbing liquid in aerosol form through a constriction with a contacting power sufficient to cause a friction loss of at least 960 (foot pound force)/pound mass, and thereafter separating the scrubbing liquid from the gas stream.

2. A method according to claim 1 in which said separation of the scrubbing liquid from the gas stream is effected by scrubbing the gas stream with said scrubbing liquid in a scrubbing tower.

3. A method according to claim 1 in which said reaction gas is contacted with the scrubbing liquid in aerosol form by flowing the reaction gas through a venturi constriction and passing scrubbing liquid into said restriction.

4. A method according to claim 1 in which said scrubbing liquid is water.

5. A method according to claim 1 in which said contacting is effected with a contacting power sufficient to cause a friction loss of at least 3850 (foot pound force)/ pound mass.

6. A method according to claim 1 in which said separation of the scrubbing liquid from the gas stream is effected by centrifugal action in a cyclone separator.

7. A method of recovering pyromellitic dianhydride from the reaction gas of a vapor phase catalytic reaction for its production which comprises flowing the reaction gas and scrubbing liquid through a venturi constriction so as to convert the scrubbing liquid to an aerosol form and contact the scrubbing liquid with the reaction gas with a contacting power sufficient to cause a friction loss of at least 1050 (foot pound force)/pound mass, and thereafter scrubbing the gas stream with a scrubbing liquid and recovering the pyromellitic dianhydride from the scrubbing liquid.

8. A method according to claim 7 in which said scrubbing is effected by passing the gas stream after said contacting with the scrubbing liquid in aerosol form upward through a scrubbing tower and spraying the scrubbing liquid downwardly through the tower.

9. A method according to claim 7 in which said scrubbing liquid is water.

10. A method of recovering pyromellitic dianhydride from the reaction gas of a vapor phase catalytic reaction for its production which comprises flowing the reaction gas through a venturi constriction, carburating water into said venturi constriction so as to convert the same to aerosol form, and contact the same with the gas stream with a contacting power sufficient to cause a friction loss of at least 960 (foot pounds force)/mass, thereafter passing the reaction gas upwardly through a scrubbing tower, passing water downwardly through the tower, and in contact with the gas and recovering the pyromellitic dianhydride from the water.

11. A method according to claim 10 in which the water is sprayed downwardly through the scrubbing tower.

12. A method of recovering pyromellitic dianhydride from the reaction gas of a vapor phase catalytic reaction for its production which comprises flowing the reaction gas through a venturi constriction carburating water into said venturi constriction so as to convert the same to aerosol form, and contact the same with the gas stream with a velocity sufficient to cause a pressure drop across the constriction of at least 0.5 p.s.i.g., thereafter passing the reaction gas upwardly through a scrubbing tower, passing water downwardly through the tower, and in contact with the gas and recovering the pyromellitic dianhydride from the water.

13. A method according to claim 12 in which the gas is passed through the venturi constriction at a velocity sufficient to cause a pressure drop across the restriction of at least 1 p.s.i.g.

References Cited

UNITED STATES PATENTS

| | | | |
|---|---|---|---|
| 1,760,335 | 5/1930 | Becker | 55—94 X |
| 3,008,807 | 11/1961 | Hilgert et al. | 55—94 X |
| 3,212,235 | 10/1965 | Markant | 55—94 X |

REUBEN FRIEDMAN, *Primary Examiner.*

J. ADEE, *Assistant Examiner.*